April 25, 1939.　　J. P. CALCATERRA ET AL　　2,156,009
MOWER ATTACHMENT
Filed July 29, 1937　　2 Sheets-Sheet 1

J. P. Calcaterra
P. Ferrero
INVENTORS
BY Victor J. Evans & Co.
ATTORNEYS

April 25, 1939.　　J. P. CALCATERRA ET AL　　2,156,009
MOWER ATTACHMENT
Filed July 29, 1937　　2 Sheets-Sheet 2
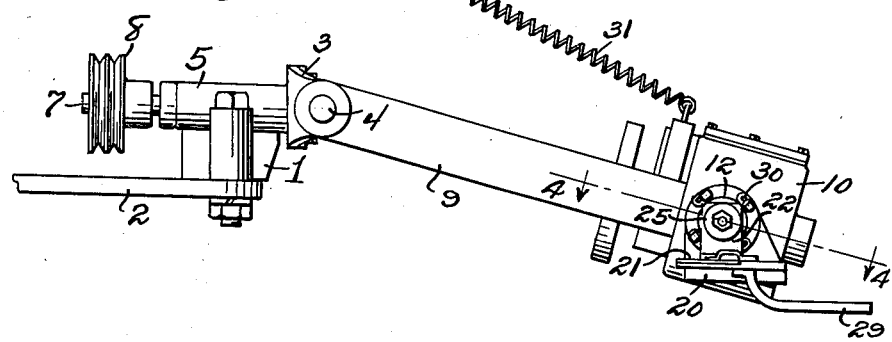
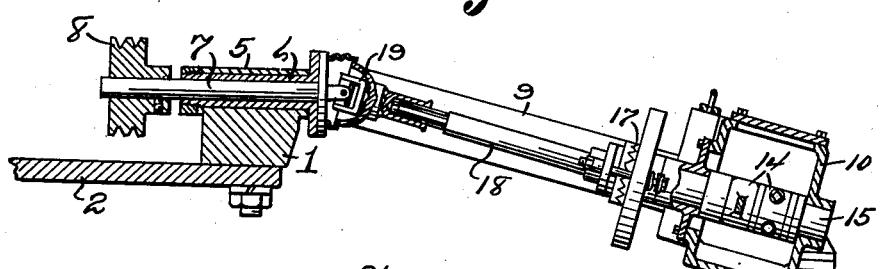
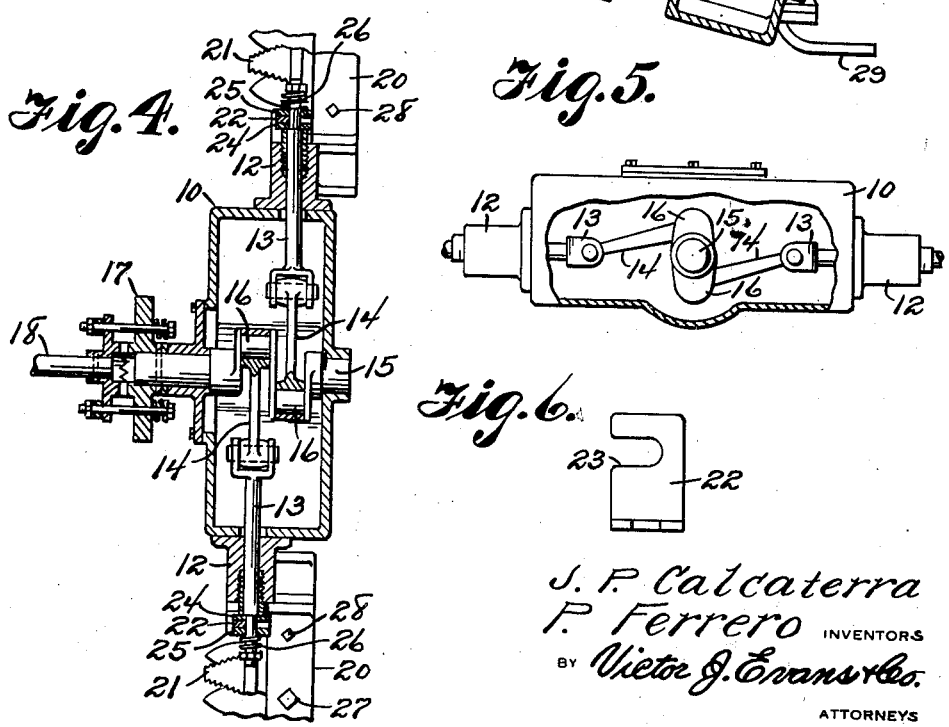
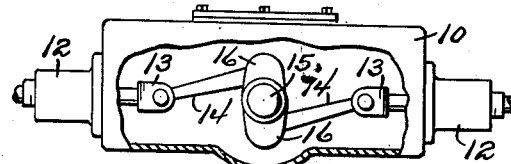
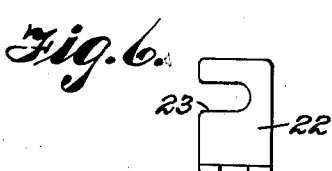
J. P. Calcaterra
P. Ferrero INVENTORS
BY Victor J. Evans & Co.
ATTORNEYS Patented Apr. 25, 1939

2,156,009

UNITED STATES PATENT OFFICE 2,156,009

MOWER ATTACHMENT

Joseph P. Calcaterra and Pasquale Ferrero, Stockton, Calif., assignors to The Carando Machine Works, Stockton, Calif.

Application July 29, 1937, Serial No. 156,400

2 Claims. (Cl. 56—25)

This invention relates to a mower attachment especially adapted for cutting rows of growth such as asparagus tops and has for the primary object the provision of a device of this character which may be readily mounted on a tractor to cut growth at each side of said tractor and is driven by power received from the power takeoff of the tractor.

Another object of this invention is the provision of a cutting mechanism including oppositely extending sickle bars and a drive mechanism therefor, whereby said sickle bars will be operated in unison to reduce vibration, the supporting means for the cutting mechanism and the drive mechanism being such that the angle of the sickle bars to the ground will be varied and also permit the sickle bars to readily follow the contour of the ground.

With these and other objects in view, this invention consists in certain novel features of construction, combination and arrangement of parts to be hereinafter more fully described and claimed.

For a complete understanding of our invention, reference is to be had to the following description and accompanying drawings, in which Figure 1 is a top plan view illustrating a mower attachment constructed in accordance with our invention.

Figure 2 is a side elevation illustrating the device.

Figure 3 is a sectional view taken on the line 3—3 of Figure 1.

Figure 4 is a sectional view taken on the line 4—4 of Figure 2.

Figure 5 is a fragmentary end elevation partly in section showing the connection between the sickle bars and the crank shaft of the drive mechanism.

Figure 6 is a detail view illustrating a bracket for connecting the sickle bars to the driving pitman.

Figure 1:
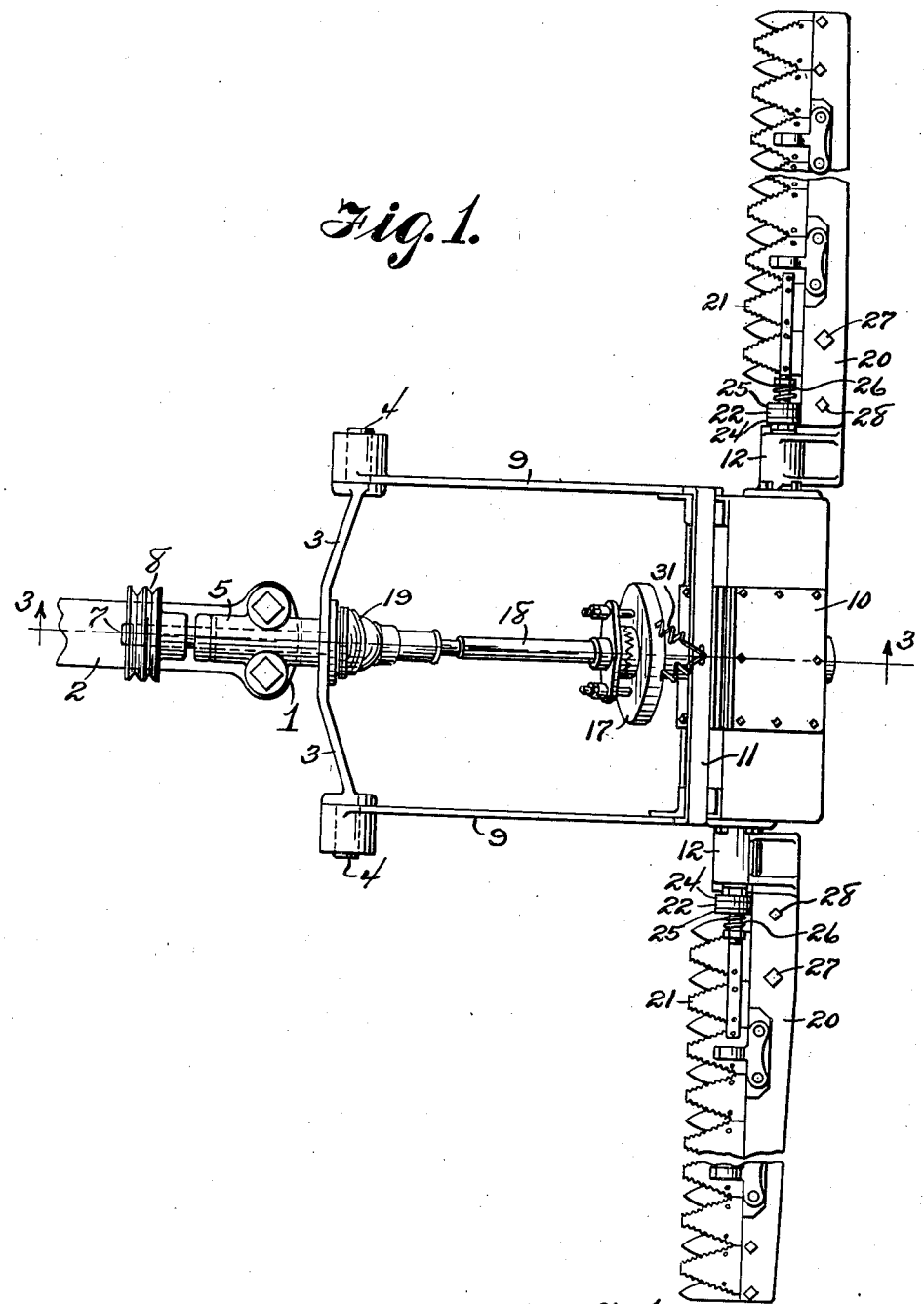

Referring in detail to the drawings, the numeral 1 indicates a bracket for detachably securing the present invention onto a draft bar 2 of a tractor or similar device (not shown). The bracket includes oppositely extending arms 3 equipped with pintles 4 and a bearing support 5 in which is located a bearing sleeve 6. The sleeve rotatably supports the shaft 7 equipped at one end with a belt pulley 8 whereby the shaft may be belted to a power takeoff shaft of the tractor. Journaled on the pintles 4 are parallel arms 9 suitably secured to a crank shaft housing 10 also connected by a brace 11. The opposite ends of the housing 10 have adjustably mounted thereon bearings 12 to rotatably support pitmans 13 which extend into the housing 10 and have pivoted thereto connecting rods 14. Journaled in the housing 10 is a crankshaft 15, the cranks 16 thereof having journaled thereon the connecting rods 14. A slip type clutch 17 is connected to the crankshaft and also has connected thereto a shaft 18 and the latter is connected to the shaft 6 by a universal joint 19 to permit the shaft 18 to follow the movements of the arms 9 as well as the movement of the crank shaft housing.

Sickle bars 20 are secured on the bearings 12 and have slidable thereon the sickles 21 each equipped with a bracket 22 having a notch 23. The pitmans 13 extend through the notches 23 of the brackets 22, also extend through discs 24 and 25. The discs 24 are secured on the sickle bars while the discs 25 bear against coil springs 26 mounted on the pitmans. The brackets 22 fit between the discs 24 and 25. The sickle bars are connected to the bearings 12 by pivot bolts 27 and retaining bolts 28. The retaining bolts 28 prevent pivotal movement of the sickle bars and when it is desired to fold the sickle bars and sickles carried thereby in a rearward direction, the retaining bolts 28 are removed and as the discs 25 may yield the brackets 22 will disengage from the pitmans during the pivotal movement of the sickle bars in said rearward direction. The sickle bars when swung rearwardly will permit the tractor and the attachment to pass through narrow spaces. The sickle bars are provided with shoes 29 to engage with the ground and govern the closeness in which the sickles cut in relation to the ground. As the bearings 12 are mounted on the housing 10 for a limited rotation, as shown at 30, in Figure 2, the angle of inclination of the sickle bars and sickles with respect to the ground may be varied.

When the pitmans are connected to the sickles, as shown in Figure 4, and the sickle bars held against pivotal movement the sickles will be reciprocated simultaneously both moving outwardly and inwardly at the same time with respect to the ends of the crankshaft housing which tends to reduce vibration. The sickles operate to cut comparatively wide paths at each side of the tractor during the forward movement of the latter, consequently rendering the device for cutting rows of growth with the tractor driven between the rows being cut. The shoes 29 riding upon the ground and the arms 9 being journaled on the arms 3 permits the device to readily rise and fall with the unevenness of the ground and to aid in supporting the device in an operative position coil springs 31 are connected with the brace 11 and to the tractor.

An attachment of the character described will successfully sever rows of growth at each side of the tractor allowing large acreage to be cut in a comparatively short time and further provides a device which may be readily adapted to a tractor now in use and may be manufactured and sold at a low cost.

Should either of the sickles jam on account of an obstacle, the clutch 17 will slip and prevent any of the moving parts of the device from breaking.

What is claimed is:

1. A mower attachment comprising a housing, arms secured to said housing, means rotatably and detachably connecting the arms onto a tractor, a crankshaft journaled in said housing, bearings secured to opposite sides of the housing, sickle bars pivoted on said bearings and extending in opposite directions from the housing, securing means for fixing the sickle bars against pivotal movement, sickles carried by the sickle bars, pitmans slidable in said bearings and actuated by said crankshaft, means detachably connecting the pitmans to said sickles, a drive means connected with said shaft and adapted to be connected with a power takeoff of the tractor.

2. A mower attachment comprising a housing, bearings secured to opposite ends of the housing, arms secured to said housing, a bracket having said arms journaled thereon and adapted to be detachably mounted on a tractor, sickle bars pivotally and detachably connected to said bearings and extending in opposite directions from the housing, securing means for retaining the sickle bars against pivotal movement, sickles carried by said sickle bars, pitmans slidable in said bearings and entering said housing, means detachably connecting the pitmans to said sickles, a crank shaft journaled on said housing, a connecting rod for connecting the pitmans to said crankshaft, a slip clutch connected to the crankshaft, a power shaft journaled in said bracket and connected with said clutch and including a universal joint and a belt pulley for receiving a belt of a power takeoff of the tractor.

JOSEPH P. CALCATERRA.
PASQUALE FERRERO.